(12) United States Patent
Jung et al.

(10) Patent No.: US 11,537,318 B2
(45) Date of Patent: Dec. 27, 2022

(54) MEMORY SYSTEM AND OPERATING METHOD THEREOF

(71) Applicant: SK hynix Inc., Gyeonggi-do (KR)

(72) Inventors: Hoe-Seung Jung, Seoul (KR); Joo-Young Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 64 days.

(21) Appl. No.: 16/680,938

(22) Filed: Nov. 12, 2019

(65) Prior Publication Data
US 2020/0379681 A1    Dec. 3, 2020

(30) Foreign Application Priority Data
May 29, 2019   (KR) .......................... 10-2019-0063271

(51) Int. Cl.
G06F 3/06 (2006.01)

(52) U.S. Cl.
CPC .......... *G06F 3/0659* (2013.01); *G06F 3/0619* (2013.01); *G06F 3/0652* (2013.01); *G06F 3/0656* (2013.01); *G06F 3/0679* (2013.01)

(58) Field of Classification Search
CPC .... G06F 3/0659; G06F 3/0619; G06F 3/0652; G06F 3/0656; G06F 3/0679
See application file for complete search history.

(56) References Cited

U.S. PATENT DOCUMENTS

| 9,817,732 | B1 * | 11/2017 | Fair | G06F 11/2007 |
| 2017/0242600 | A1 * | 8/2017 | Kim | G06F 3/0655 |
| 2017/0277451 | A1 * | 9/2017 | Gole | G06F 11/004 |
| 2017/0301400 | A1 * | 10/2017 | Byun | G06F 13/16 |

(Continued)

FOREIGN PATENT DOCUMENTS

| KR | 10-2017-0099618 | 9/2017 |
| KR | 10-2018-0114649 | 10/2018 |

OTHER PUBLICATIONS

Merriam-webster: a screen shot of www.merriam-webster.com/dictioniary/queue taken via archive.org Mar. 16, 2016. (Year: 2016).*

(Continued)

*Primary Examiner* — William E. Baughman
*Assistant Examiner* — Janice M. Girouard
(74) *Attorney, Agent, or Firm* — IP & T Group LLP (57) ABSTRACT

A memory system includes: a memory device; a command queue queuing a program descriptor and a first read descriptor, and sequentially outputting the descriptors; a program manager performing an error handling operation in response to the program descriptor, the error handling operation including performing a program operation on a second physical address when a program operation performed on a first physical address fails; a fail managing buffer storing the first physical address for the failed program operation; a queue manager deleting the first read descriptor from the command queue and outputting an exception signal, when a physical address of the first read descriptor is the same as the first physical address; and a descriptor generator generating a second read descriptor including the second physical address in response to the exception signal and enqueuing the second read descriptor in the command queue, when the error handling operation passed.

20 Claims, 7 Drawing Sheets

(56) References Cited

U.S. PATENT DOCUMENTS

| | | | | |
|---|---|---|---|---|
| 2018/0032415 | A1* | 2/2018 | Song | G06F 11/1048 |
| 2019/0155541 | A1* | 5/2019 | Chan | G06F 3/0688 |
| 2019/0205065 | A1* | 7/2019 | Nakanishi | G06F 11/1016 |
| 2019/0391747 | A1* | 12/2019 | Sheperek | G06F 12/10 |

OTHER PUBLICATIONS

A screen shot of the merriam-webster.com/dictionary for the term "when" taken Feb. 24, 2013 (Year: 2013).*

An article "Understanding Flash: Blocks, Pages and Program / Erases" published Jun. 20, 2024, available online at https://flashdba.com/2014/06/20/understanding-flash-blocks-pages-and-program-erases/ (Year: 2014).*

\* cited by examiner

MEMORY SYSTEM AND OPERATING METHOD THEREOF

CROSS-REFERENCE TO RELATED APPLICATION

This application claims priority under 35 U.S.C. § 119 to Korean Patent Application No. 10-2019-0063271, filed on May 29, 2019, which is incorporated herein by reference in its entirety.

BACKGROUND

1. Field

Various embodiments relate to a memory system, and more particularly, to a memory system for efficiently performing a read operation, and an operating method thereof.

2. Discussion of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts, as compared with a hard disk device. Examples of memory systems having such advantages include universal serial bus (USB) memory devices, memory cards having various interfaces, and solid state drives (SSD).

SUMMARY

Various embodiments are directed to a memory system which generates a read descriptor having a physical address at which data have been successfully reprogrammed, through an error handling operation for the data which failed to be programmed, when a read descriptor having a page in which a program fail occurred as a physical address is queued in a command queue, thereby preventing the failed data from being read.

In accordance with an embodiment of the present invention, a memory system may include a memory device comprising a plurality of memory dies; a command queue suitable for queuing a program descriptor and a first read descriptor therein, and sequentially providing the queued descriptors to the memory device; a program manager suitable for controlling the memory device to perform an error handling operation in response to the program descriptor, the error handling operation including performing a program operation on a second physical address when a program operation performed on a first physical address fails; a fail managing buffer suitable for temporarily storing the first physical address for the failed program operation; a queue manager suitable for deleting the first read descriptor from the command queue and outputting an exception signal, when a physical address in the first read descriptor is the same as the stored first physical address; and a descriptor generator suitable for generating a second read descriptor including the second physical address in response to the exception signal and enqueuing the second read descriptor in the command queue, when the error handling operation passed.

In accordance with another embodiment of the present invention, a method for operating a memory system may include enqueuing a program descriptor and a first read descriptor in a command queue; performing an error handling operation in response to the program descriptor, the error handling operation including performing a program operation on a second physical address when a program operation performed on a first physical address fails; temporarily storing the first physical address for the failed program operation in a fail managing buffer; deleting the first read descriptor from the command queue and outputting an exception signal, when a physical address included in the first read descriptor is the same as the stored first physical address; and generating a second read descriptor including the second physical address in response to the exception signal and enqueuing the second read descriptor in the command queue, when the error handling operation passed.

In accordance with another embodiment of the present invention, a memory system may include a memory device including a plurality of memory dies; a processor suitable for controlling a program operation and a read operation of the memory device; and a memory interface suitable for interfacing the processor and the memory device, wherein the memory interface includes: a command queue suitable for queuing a program descriptor and a first read descriptor therein, and sequentially providing the queued descriptors to the memory device; a fail managing buffer suitable for temporarily storing a first physical address for a failed program operation; and a queue manager suitable for deleting the first read descriptor from the command queue and outputting an exception signal, when a physical address in the first read descriptor is the same as the stored first physical address, wherein the processor includes: a program manager suitable for controlling the memory device to perform an error handling operation in response to the program descriptor, the error handling operation including performing a program operation on a second physical address when a program operation performed on the first physical address fails; and a descriptor generator suitable for generating a second read descriptor including the second physical address in response to the exception signal and enqueuing the second read descriptor in the command queue, when the error handling operation passes.

In accordance with another embodiment of the present invention, a method of operating a memory system including a processor, a memory interface and a memory device, may include: performing a programming operation to program data to a first location having a first address in the memory device; issuing a program fail signal to the processor when the programming operation was not successful; controlling the memory device, by the processor, to program the data to a second location having a second address; storing a descriptor including the first address where the programming operation failed.

DETAILED DESCRIPTION

Various embodiments of the present invention are described below in more detail with reference to the accompanying drawings. The present invention may, however, be embodied in different forms and should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention.

It is noted that reference to "an embodiment," "another embodiment" or the like does not necessarily mean only one embodiment, and different references to any such phrase are not necessarily to the same embodiment(s).

It will be understood that, although the terms "first" and/or "second" may be used herein to identify various elements, these elements should not be limited by these terms. These terms are only used to distinguish one element from another element that otherwise have the same or similar names. A first element discussed below in one instance could be termed a second element in another instance without changing the structure or function of the underlying element.

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, singular forms are intended to include the plural forms as well, unless the context clearly indicates otherwise. It will be further understood that the terms "comprise", "include", "have", etc. when used in this specification, specify the presence of stated features, numbers, steps, operations, elements, components, and/or combinations thereof but do not preclude the presence or addition of one or more other features, numbers, steps, operations, elements, components, and/or combinations thereof.

The embodiments disclosed herein are merely for the purpose of understanding the technical spirit of the present disclosure. However, the scope of the present invention should not be limited to the disclosed embodiments. As those skilled in the art to which the present disclosure pertains will understand various modifications based on the technical spirit of the present disclosure may be made to any of the disclosed embodiments. The present invention encompasses all such modifications to the extent they fall within the scope of the claims.

Unless otherwise defined, all terms including technical and scientific terms used herein have the same meaning as commonly understood by one of ordinary skill in the art to which the present invention pertains. Unless otherwise defined in the present disclosure, terms should not be construed in an overly ideal or excessively formal way.

Various embodiments of the present invention are described in detail below with reference to the accompanying drawings.

Figure 1:
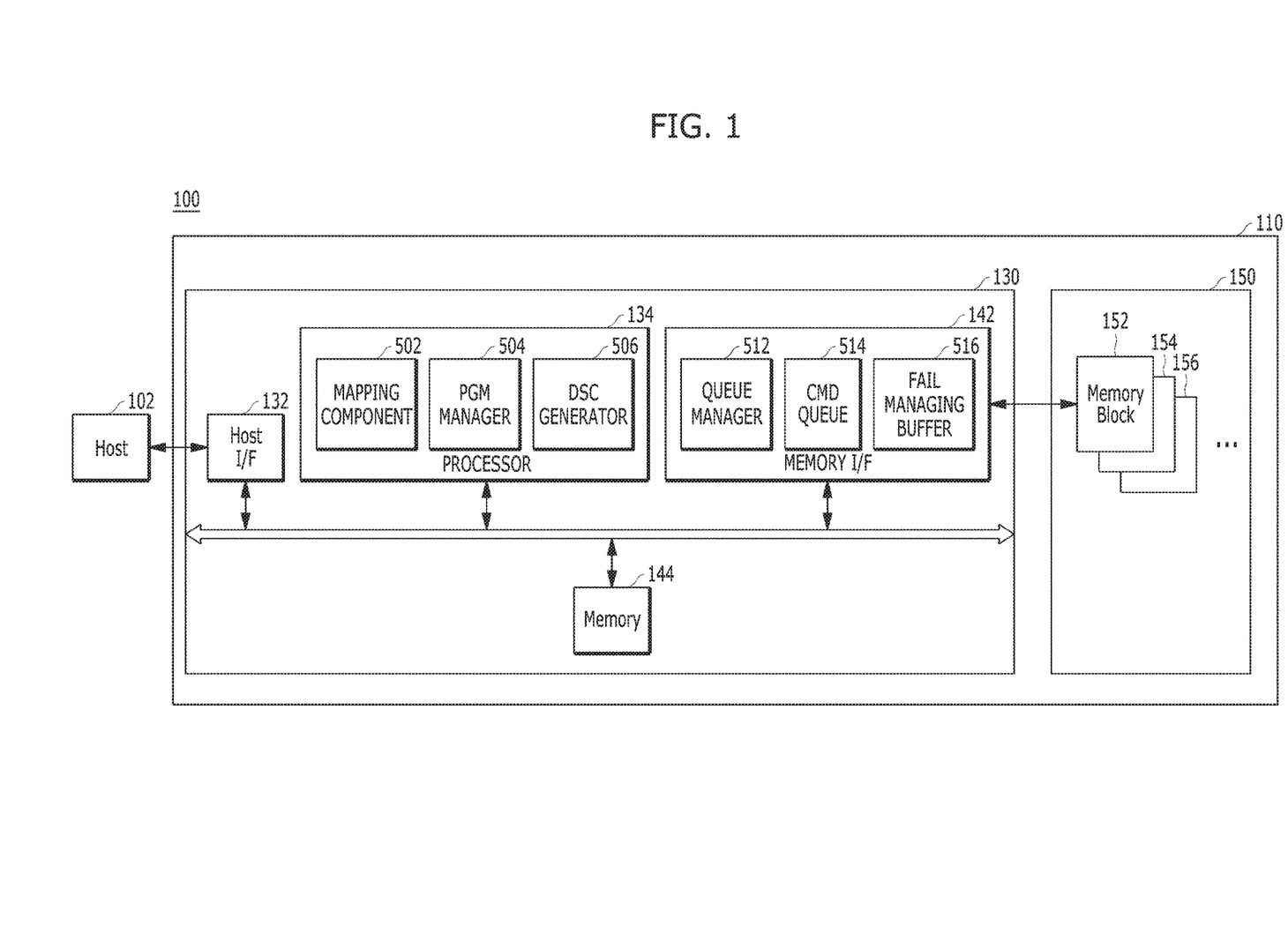
FIG. 1 is a block diagram illustrating a data processing system including a memory system in accordance with an embodiment of the present invention.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include any of a variety of portable electronic devices, such as a mobile phone, a MP3 player and a laptop computer, or any of a variety of non-portable electronic devices such as a desktop computer, a game machine, a TV and/or a projector.

The host 102 may include one or more operating systems (OSs). The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request. The OS may manage and control overall functions and operations of the host 102. The OS may support an operation between the host 102 and a user using the data processing system 100 or the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of the memory system 110 include a solid state drive (SSD), a multi-media card (MMC) and an embedded MMC (eMMC).

The memory system 110 may include any of various types of storage devices. Non-limiting examples of such storage devices include volatile memory devices such as a DRAM dynamic random access memory (DRAM) and/or a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and/or a flash memory.

The memory system 110 may include a memory device 150 and a controller 130.

The controller 130 and the memory device 150 may be integrated into a single semiconductor device, which may be included in any of the various types of memory systems as described above. For example, the controller 130 and the memory device 150 may be integrated as a single semiconductor device to constitute an SSD, a PCMCIA (personal computer memory card international association) card, SD card; e.g., a mini-SD, a micro-SD, a SDHC, and/or an UFS device. The memory system 110 may be configured as a part of a computer, a smart phone, a portable game player, or one of various components configuring a computing system.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each plane may include a plurality of memory blocks 152 to 156, each of which may include a plurality of pages, each of which may include a plurality of memory cells coupled to a word line. In an embodiment, the memory device 150 may be a flash memory having a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

More specifically, the controller 130 may include a host interface (I/F) 132, a processor 134, a memory interface 142, and a memory 144, all operatively coupled or engaged via an internal bus. As is described below with reference to FIG. 5, the processor 134 may include a mapping component 502, a program manager 504 and a descriptor generator 506. The memory I/F 142 may include a queue manager 512, a command queue 514 and a fail managing buffer 516.

The host interface 132 may process a command and data of the host 102. The host interface 132 may communicate with the host 102 through one or more of various interface protocols, such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (DATA), enhanced small disk interface (ESDI) and/or integrated drive electronics (IDE). The host interface 132 may be driven via firmware, that is, a host interface layer (FIN for exchanging data with the host 102.

The memory interface 142 may serve as a memory/storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. In another embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data required to perform data write and read operations between the host 102 and the memory device 150 and other data required for the controller 130 and the memory device 150 to perform these operations.

The processor 134 may control overall operations of the memory system 110. The processor 134 may use firmware to control the overall operations of the memory system 110. The firmware may be referred to as flash translation layer (FTL). The processor 134 may be implemented with a microprocessor and/or a central processing unit (CPU).

For example, the controller 130 may perform an operation requested by the host 102 in the memory device 150 through the processor 134. Also, the controller 130 may perform a background operation on the memory device 150 through the processor 134. The background operation performed on the memory device 150 may include copying data stored in some memory blocks among the memory blocks 152 to 156 into other memory blocks, e.g., a garbage collection (GC) operation, swapping data between select memory blocks of the memory blocks 152 to 156, e.g., a wear-leveling (WL) operation, storing map data stored in the controller 130 in select memory blocks of the memory blocks 152 to 156, e.g., a map flush operation, or managing bad blocks of the memory device 150, e.g., a bad block management operation of detecting and processing bad blocks among the memory blocks 152 to 156 in the memory device 150.

Figure 2:
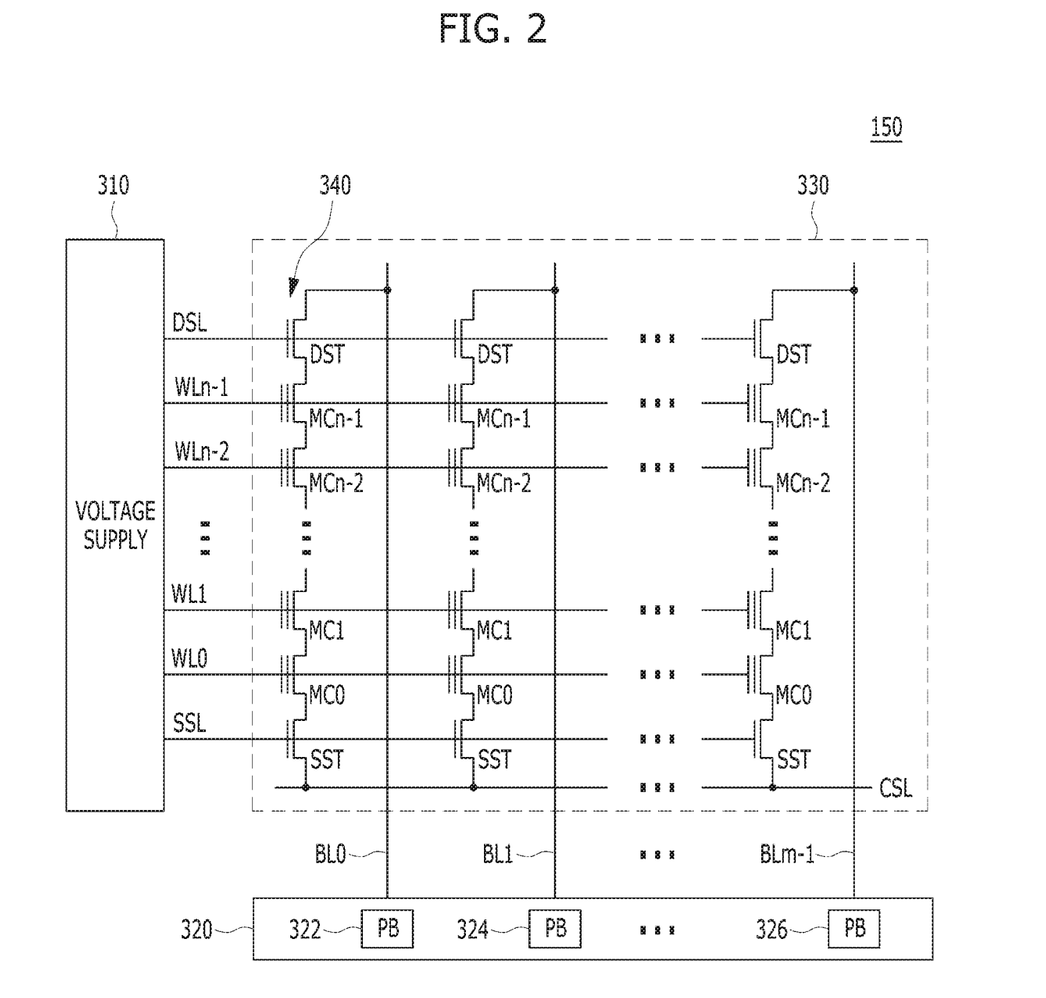
FIG. 2 is a circuit diagram illustrating a configuration of a memory cell array of a memory block in the memory device shown in FIG. 1.

Referring to FIG. 2, the memory device of the memory system in accordance with an embodiment is described in more detail.

Referring to FIG. 2, the memory block 330 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 13, the first cell string is coupled to the first bit line BL0, and the last cell string is coupled to the last bit line BLm−1.

Although FIG. 2 illustrates NAND flash memory cells, the present invention is not limited thereto. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which generates different word line voltages including a program voltage, a read voltage, and a pass voltage to supply to the word lines according to an operation mode. The voltage generation operation of the voltage supply 310 may be controlled by a control circuit (not illustrated). Under the control of the control circuit, the voltage supply 310 may select at least one of the memory blocks (or sectors) of the memory cell array, select at least one of the word lines of the selected memory block(s), and provide the word line voltages to the selected word line(s) and the unselected word lines as may be needed.

The memory device 150 may include a read/write circuit 320 which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for supplying a voltage or a current to bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

Figure 3:
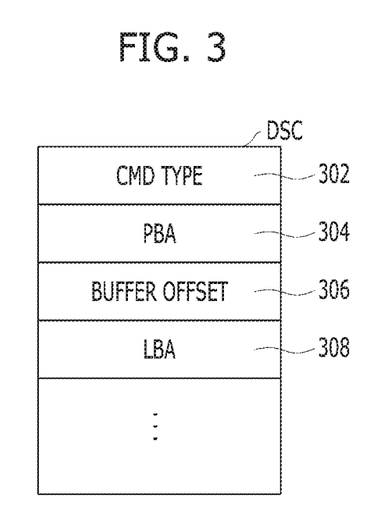
FIG. 3 is a diagram for describing a data structure of a descriptor.

FIG. 3 is a diagram for describing a data structure of a descriptor.

When a command and a logical address are provided from the host 102, the memory system 110 may map a physical address corresponding to the logical address. Specifically, when a program command, a logical address and data are provided, the processor 134 may map a physical address, at which the data is to be stored, to the logical address. Furthermore, when a read command and a logical address are provided, the processor 134 may drive an FTL to search for a physical address corresponding to the logical address. The processor 134 may generate a descriptor including information on the type of the command, the logical address and the physical address, after performing the mapping.

Referring to FIG. 3, the descriptor DSC may include information on a command type CMD TYPE, a physical address PBA, a buffer offset BUFFER OFFSET and a logical address LBA. The descriptor DSC may be divided into a plurality of regions, and first to fourth regions 302, 304, 306 and 308 may store the information on the command type CMD TYPE, the physical address PBA, the buffer offset BUFFER OFFSET and the logical address LBA respectively.

For example, in the case of a program descriptor, the information stored in the first region 302 may indicate that the type of the command is a program command, and the information stored in the second region 304 may be a physical address at which user data is to be stored. The information stored in the third region 306 may be an offset value of a host buffer in which the user data is stored, and the information stored in the fourth region 308 may be a logical address for the user data. Although not illustrated the drawing, the program descriptor may further include a user data region.

In the case of a read descriptor, the information stored in the first region 302 may indicate that the type of the command is a read command, and the information stored in the second region 304 may be a physical address at which data for the read command is stored. The information stored in the third region 306 may be an offset value of a host buffer in which read data is to be stored, and the information stored in the fourth region 308 may be a logical address corresponding to the physical address.

The processor 134 may generate the descriptor DSC, and enqueue the generated descriptor DSC in the command queue included in the memory IF 142. The memory IF 142 may sequentially provide the descriptor DSC to the memory device 150, and control the memory device 150 to perform an operation corresponding to the command included in the descriptor DSC.

The processor 134 may generate logical to physical (L2P) information and store the generated L2P information in the memory 144, in order to map a physical address corresponding to a logical address. When a program command, a logical address and user data are provided from the host 102, the processor 134 may search for a physical address at which the user data is to be stored. While the memory device 150 programs the user data to the physical address, the processor 134 may update the L2P information. Then, when a read command for the logical address is provided, the processor 134 may generate a read descriptor having the physical address at which the user data is stored, based on the L2P information, and enqueue the read descriptor in the command queue. Since the time required for updating the L2P information is shorter than the time required for programming the user data, the processor 134 may complete the L2P information update operation while the user data are programmed.

Therefore, a program descriptor may be first enqueued in the command queue, and a read descriptor having the same physical address as the physical address of the program descriptor may be then enqueued in the command queue, before checking information on whether a program operation for the program descriptor passed. When the program operation fails, the memory device 150 may read user data, which failed to be programmed, from the physical address at which the program fail occurred, according to the read descriptor.

Figure 4:
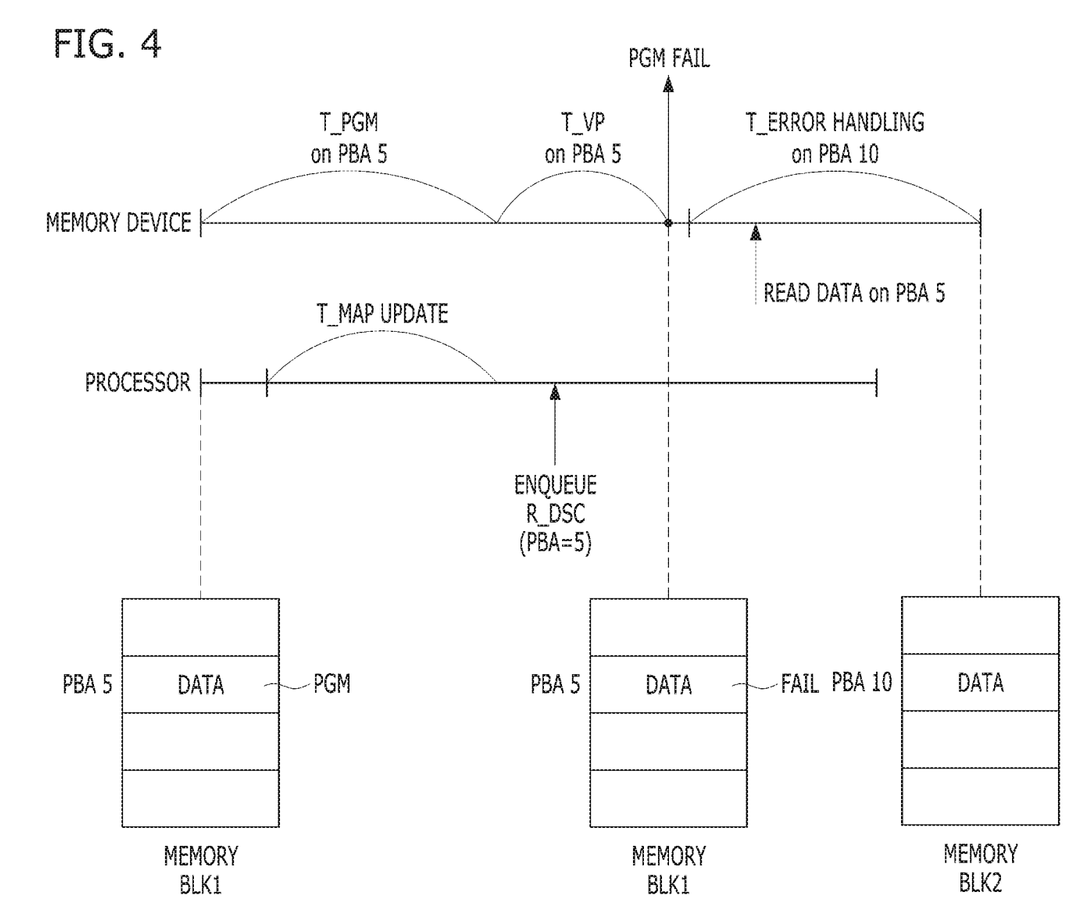
FIG. 4 is a diagram for describing an issue that occurs when a physical address included in a queued read descriptor is the same as a physical address where a program fail occurred.

FIG. 4 is a diagram for describing an issue that occurs when a physical address included in a queued read descriptor is the same as a physical address where a program fail occurred.

While the memory device 150 programs the user data DATA to a first memory block MEMORY BLK1 having a fifth physical address PBA 5, the processor 134 may update L2P information on the user data DATA. Then, when a read command for a logical address corresponding to the user data DATA is provided, the processor 134 may generate a read descriptor R_DSC having the fifth physical address PBA 5 based on the L2P information, and enqueue the read descriptor R_DSC in the command queue.

When the program operation for the fifth physical address PBA 5 is completed, the memory device 150 may perform a program verify operation of checking whether the program operation passed. When the result of the program verify operation indicates that the program operation for the fifth physical address PBA 5 failed (PGM FAIL), the processor 134 may control the memory device 150 to perform an error handling operation on the user data DATA. The error handling operation may include reprogramming the user data DATA to a second memory block MEMORY BLK2 which is a new normal memory block having a new 10th physical address PBA 10, instead of the first memory block MEMORY BLK1 having the fifth physical address PBA 5 at which the program operation failed.

The read descriptor R_DSC enqueued in the memory I/F 142 may include the information on the fifth physical address PBA 5 at which the program fail occurred. Thus, when the memory device 150 performs a read operation according to the read descriptor, the user data DATA may be read from the fifth physical address PBA 5 at which the program fail occurred, instead of the 10th physical address PBA 10 which is a new physical address changed through the error handling operation.

According to the related art, in order to prevent reading data stored at a physical address at which a program fail occurred, the processor stores information on a physical address at which a program operation is being performed or a first physical address included in a program descriptor enqueued in the command queue. Then, when a read command and a logical address are provided, the processor may map the logical address to a second physical address, and then generate a read descriptor. When the first and second physical addresses are the same, the processor does not enqueue the read descriptor in the command queue. When a program operation for the first physical address fails, the processor may perform error handling to program the failed data to a normal memory block having a third physical address, and update the read descriptor to have the third physical address as the physical address thereof.

According to the related art, when the first physical address at which the program fail has occurred is the same as the second physical address of the read descriptor generated through the mapping operation, the processor does not enqueue the read descriptor in the command queue, and thus prevents the failed data from being read. However, since the processor performs an operation of comparing the first and second physical addresses, the performance of the processor is degraded. For example, since the processor controls overall operations of the memory system, the processor may control various operations at the same time. However, if the processor performs the operation of comparing the first and second physical addresses, the performances of other operations performed at the same time is degraded. Furthermore, until the error handling operation is completed, the processor does not enqueue the read descriptor. Therefore, the control operation is delayed.

In accordance with an embodiment, even when a read descriptor for a physical address at which a program operation is being performed is generated, the processor 134 may provide the read descriptor to the memory I/F 142. The memory I/F 142 may enqueue the descriptor in the command queue. The memory I/F 142 may store information on the first physical address at which the program fail occurred. When a read descriptor including the same physical address as the first physical address is enqueued in the command queue, the memory I/F 142 may delete the read descriptor, and then provide an exception signal to the processor 134. The processor 134 may map the logical address of the data which failed to be programmed to the second physical address which is a new physical address, and then generate a read descriptor having the second physical address in response to the exception signal. Then, the processor 134 may provide the read descriptor to the memory I/F 142 again.

In accordance with an embodiment, the processor 134 need not determine whether the physical address at which the program operation is being performed is the same as the physical address included in the read descriptor. Furthermore, the processor 134 may control the memory I/F 142 to enqueue the read descriptor in the command queue, regardless of whether the error handling operation is completed. Therefore, it is possible to prevent the user data stored at the physical address where the program fail occurred from being read, while improving the operation performance of the processor 134. As a result, the performance of the read operation can be improved.

Figure 5:
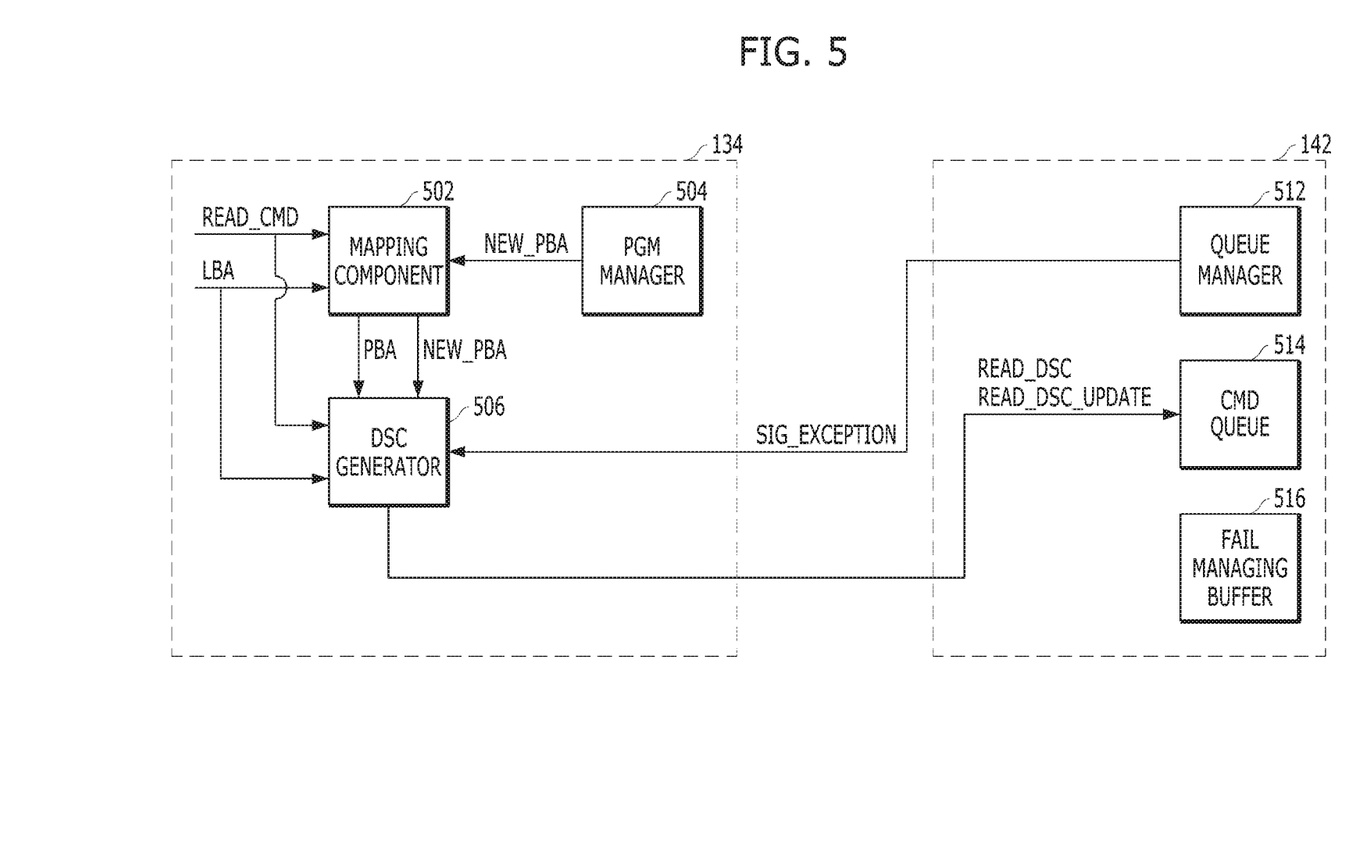
FIG. 5 is a detailed diagram illustrating a memory system in accordance with an embodiment.

FIG. 5 is a detailed diagram illustrating a memory system 110 in accordance with an embodiment. For clarity, FIG. 5 illustrates only components of the data processing system 100 of FIG. 1 that are related to the processing described below.

The controller 130 may include the processor 134 and the memory I/F 142. The processor 134 may include a mapping component 502, a program manager 504 and a descriptor generator 506. The memory I/F 142 may include a queue manager 512, a command queue 514 and a fail managing buffer 516. Although not illustrated in the drawing, the processor 134 may include a read manager for controlling the memory device 150 to perform a read operation.

The program manager 504 may control the memory device 150 to perform a program operation and an error handling operation. When the program operation fails, the program manager 504 may control the memory device 150 to perform the error handling operation. The error handling operation may include reprogramming user data to a normal memory block, that is, a different memory block from where the program fail occurred. The program manager 504 may provide the mapping component 502 with information on the physical address at which the user data is programmed.

The mapping component 502 may generate L2P information based on the information on the physical address. The mapping component 502 may convert a logical address LBA provided from the host 102 into a physical address PBA based on the L2P information. The mapping component 502 may convert the logical address LBA into a physical address PBA at which user data for a read command READ_CMD is stored, based on the read command READ_CMD and the logical address LBA which are provided from the host 102. The mapping component 502 may provide information on the physical address PBA to the descriptor generator 506.

The descriptor generator 506 may generate a descriptor based on the command and the logical address provided from the host 102 and the physical address PBA provided from the mapping component 502. When the read command READ_CMD is provided from the host 102, the descriptor generator 506 may generate a read descriptor READ_DSC. As described above with reference to FIG. 3, the read descriptor READ_DSC may have a structure including a plurality of regions, and include information on a command type, a logical address and a physical address. The descriptor generator 506 may provide the read descriptor READ_DSC to the memory I/F 1.42.

The queue manager 512 may enqueue the provided read descriptor READ_DSC in the command queue 514. The queue manager 512 may store a program descriptor, where a program fail occurred, into the fail managing buffer 516. When the physical address of the program descriptor stored in the fail managing buffer 516 is the same as the physical address of the read descriptor READ_DSC enqueued in the command queue 514, the queue manager 512 may delete the read descriptor READ_DSC from the command queue 514. For example, the queue manager 512 need not provide the read descriptor READ_DSC enqueued in the command queue 514 to the memory device 150, but instead may delete the read descriptor READ_DSC from the command queue 514. The queue manager 512 may provide the exception signal SIG_EXCEPTION to the descriptor generator 506, after deleting the read descriptor READ_DSC.

FIG. 5 illustrates one command queue 514 and one fail managing buffer 516. In accordance with another embodiment, however, the memory I/F 142 may include multiple command queues and fail managing buffers, one set for each of the memory dies in the memory device 150.

In accordance with an embodiment, when the read descriptor READ_DSC having the same physical address as a physical address where a program fail occurred is enqueued in the command queue 514, the queue manager 512 may delete the read descriptor READ_DSC from the command queue 514 such that the memory device 150 does not read failed data according to the read descriptor READ_DSC. Furthermore, the queue manager 512 may provide the exception signal SIG_EXCEPTION to the descriptor generator 506, and control the descriptor generator 506 such that the read descriptor READ_DSC has a new physical address changed through an error handling operation, when the error handling operation passed.

Figure 6:
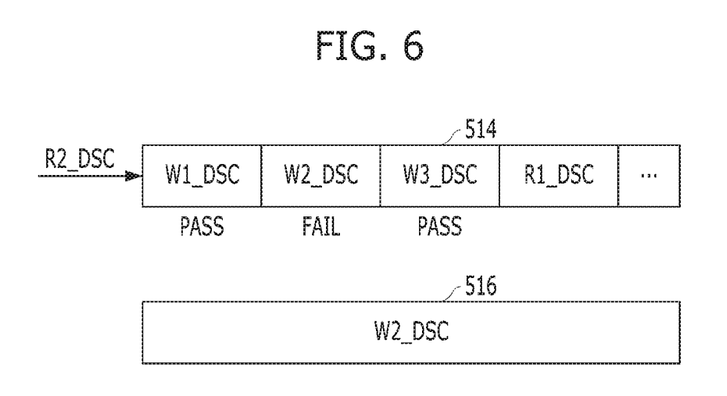
FIG. 6 is a diagram illustrating a command queue and a fail managing buffer.

FIG. 6 is a diagram illustrating the command queue and the fail managing buffer.

The command queue 514 may queue a descriptor provided from the descriptor generator 506. For example, the command queue 514 may queue first to third program descriptors W1_DSC to W3_DSC and a first read descriptor R1_DSC. The fail managing buffer 516 may buffer information on a descriptor where a program fail occurred. Specifically, when program operations for the first and third program descriptors W1_DSC and W3_DSC passes (PASS) and a program operation for the second program descriptor W2_DSC fails (FAIL), the queue manager 512 may store information on the second program descriptor W2_DSC in the fail managing buffer 516.

Whenever a new read descriptor is enqueued in the command queue 514, the queue manager 512 may compare the physical address of the read descriptor to the physical address of the second program descriptor W2_DSC stored in the fail managing buffer 516. For example, when the second read descriptor R2_DSC is enqueued in the command queue 514, the queue manager 512 may compare the physical address of the second read descriptor R2_DSC to the physical address of the second program descriptor W2_DSC. In accordance with another embodiment, the queue manager 512 may compare the physical address of a read descriptor enqueued in the command queue 514 to a physical address where a fail occurred (failed physical address), whenever the failed physical address is stored in the fail managing buffer 516. When the physical address of the second read descriptor R2_DSC is the same as the physical address of the second program descriptor W2_DSC, the queue manager 512 may delete the second read descriptor R2_DSC enqueued in the command queue 514, and provide the exception signal SIG_EXCEPTION to the descriptor generator 506.

Referring back to FIG. 5, the descriptor generator 506 may regenerate a read descriptor in response to the provided exception signal SIG_EXCEPTION. Specifically, when the error handling operation passed, the program manager 504 may provide the mapping component 502 with information on a physical address NEW_PBA changed by reprogramming the failed data through the error handling operation, and the mapping component 502 may update the L2P information based on the physical address NEW_PBA. The mapping component 502 may provide the descriptor generator 506 with the information on the physical address NEW_PBA based on the updated L2P information. The descriptor generator 506 may regenerate the read descriptor based on the physical address NEW_PBA, and control the memory device 150 to read user data from the new physical address NEW_PBA changed through the error handling operation. The descriptor generator 506 may provide the read descriptor READ_DSC_UPDATE to the memory I/F 142.

The memory I/F 142 may enqueue the read descriptor READ_DSC_UPDATE in the command queue 514. In accordance with an embodiment, the memory device 150 may read the user data from the new physical address changed through the error handling operation instead of the physical address where the program fail occurred, based on the read descriptor READ_DSC_UPDATE, thereby preventing occurrence of a read error. Furthermore, the queue manager 512 included in the memory I/F 142 may compare the physical address of the read descriptor enqueued in the command queue 514 to the physical address of the program descriptor enqueued in the fail managing buffer 516, thereby lowering an operational burden of the processor 134. Furthermore, the processor 134 may preferentially enqueue a read descriptor, which is generated regardless of whether the error handling operation is completed, in the command queue 514, thereby improving the program and read speed.

Figure 7:
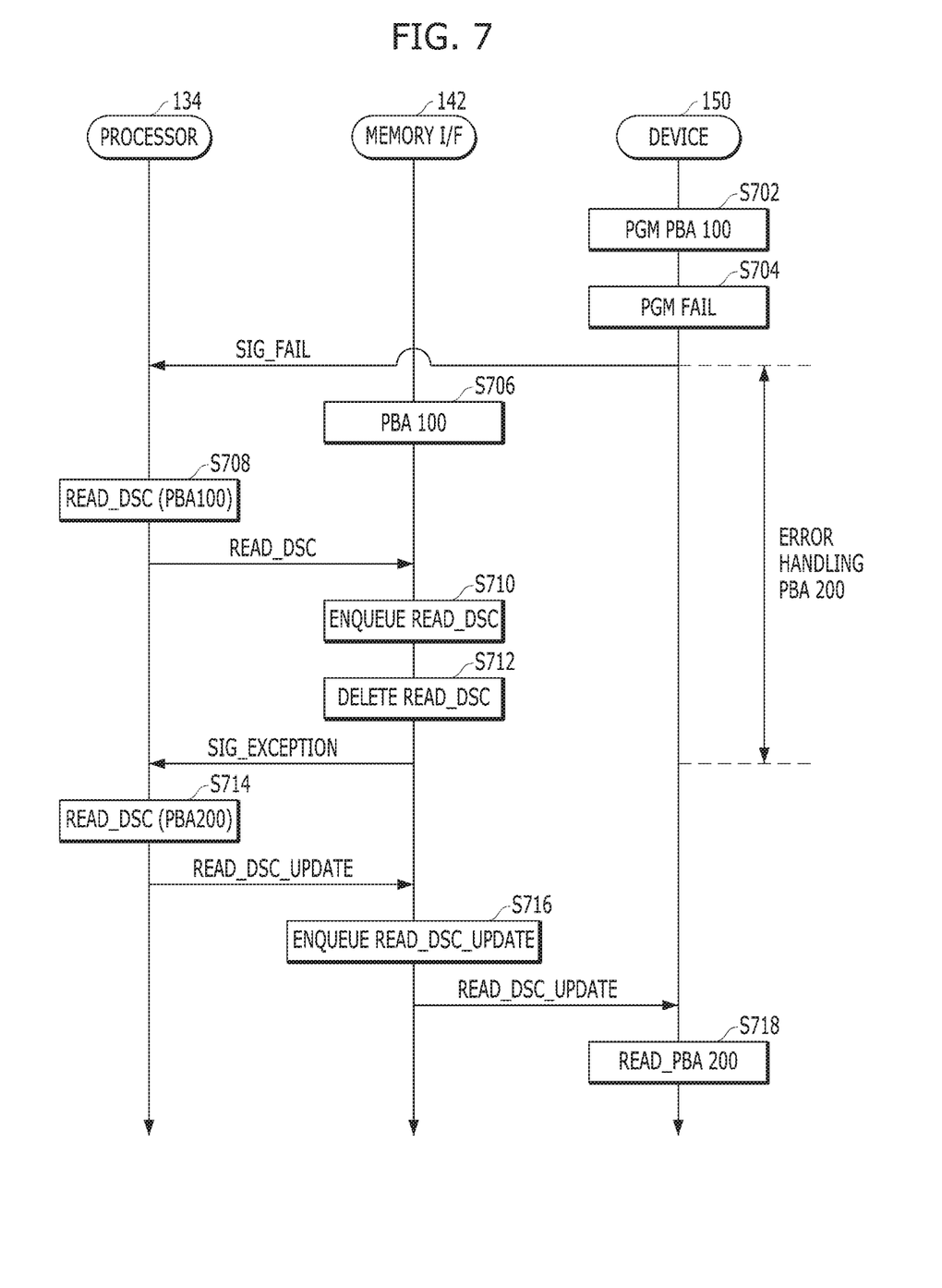
FIG. 7 is a flowchart illustrating an operating method of a memory system in accordance with an embodiment.

FIG. 7 is a flowchart illustrating an operating method of the memory system 110 in accordance with an embodiment.

In step S702, the memory device 150 may program user data under control of the processor 134. For example, the memory device 150 may program the user data to a memory block PBA 100 having a physical address of '100'.

In step S704, the memory device 150 may check whether the program operation performed in step S702 passed. When the program operation fails, the memory device 150 may provide a fail signal SIG_FAIL to the processor 134. The processor 134 may control the memory device 150 to perform an error handling operation in response to the fail signal SIG_FAIL. The memory device 150 may perform the error handling operation to reprogram the user data to another normal memory block PBA 200 having a physical address of '200'.

In step S706, the memory I/F 142 may store information on the physical address PBA 100 where the program fail occurred in step S704. Specifically, the queue manager 512 described above with reference to FIG. 5 may store a program descriptor including the physical address PBA 100 in the fail managing buffer 516.

In step S708, the processor 134 may generate a read descriptor READ_DSC in response to a read command provided from the host 102. The processor 134 may generate the read descriptor READ_DSC described above with reference to FIG. 3 by converting a logical address for the read command into a physical address. When the logical address for the read command is the same as the logical address for the program operation performed in step S702, the converted physical address may have a value of '100' (PBA 100). The processor 134 may provide the read descriptor READ_DSC to the memory I/F 142.

In step S710, the memory I/F 142 may enqueue the read descriptor READ_DSC in the command queue 514. The memory I/F 142 may compare the physical address PBA 100 of the read descriptor READ_DSC to the physical address PBA 100 stored in the fail managing buffer 516.

In step S712, when the read descriptor READ_DSC including the same physical address PBA 100 as the physical address PBA 100 stored in the fail managing buffer 516 is enqueued, the memory I/F 142 may delete the read descriptor READ_DSC. The memory I/F 142 may provide the exception signal SIG_EXCEPTION to the processor 134. In accordance with an embodiment, when the read descriptor READ_DSC including the physical address PBA 100 where the program fail occurred is enqueued in the command queue 514 instead of the physical address PBA 200 changed through the error handling operation, the memory I/F 142 may delete the read descriptor READ_DSC, thereby preventing the failed data from being read. Furthermore, the memory I/F 142 may provide the exception signal SIG_EXCEPTION to the processor 134, and control the processor 134 to update the read descriptor READ_DSC based on the physical address PBA 200 changed through the error handling operation, when the error handling operation passed.

In step S714, the processor 134 may generate a read descriptor READ_DSC_UPDATE including the physical address PBA 200 changed through the error handling operation, in response to the exception signal SIG_EXCEPTION.

The processor 134 may provide the read descriptor READ_DSC_UPDATE to the memory I/F 142.

In step S716, the memory I/F 142 may enqueue the provided read descriptor READ_DSC_UPDATE in the command queue 514.

In step S718, the memory device 150 may read user data stored at the physical address PBA 200 changed through the error handling operation, based on the read descriptor READ_DSC_UPDATE, under control of the processor 134.

In accordance with embodiments, the memory system may include the memory I/F configured to delete a read descriptor from the command queue and provide an exception signal to the processor, when the physical address of a page where a program fail occurred is the same as the physical address of the read descriptor queued in the command queue. The processor may generate a read descriptor having a new physical address at which failed data are reprogrammed through the error handling operation in response to the exception signal, and enqueue the generated read descriptor in the command queue, thereby preventing the failed data from being read.

Although various embodiments have been illustrated and described, it will be apparent to those skilled in the art in light of the present disclosure that various changes and modifications may be made without departing from the spirit and scope of the invention as defined in the following claims. The present invention encompasses all such changes and modifications that fall within the scope of the claims.

What is claimed is:

1. A memory system comprising:
   a memory device comprising a plurality of memory dies; and
   a controller including a host interface, a memory interface, and a processor,
   wherein the memory interface includes a command queue configured to queue a program descriptor and a first read descriptor therein, and sequentially provide the queued descriptors to the memory device,
   a fail managing buffer configured to temporarily store a first physical address for a failed program operation, and
   a queue manager configured to prevent failed data at the first physical address for the failed program operation from being read by deleting the first read descriptor from the command queue and outputting an exception signal, after a physical address in the first read descriptor is stored in the fail managing buffer, and
   wherein the processor includes a program manager configured to control the memory device to perform an error handling operation in response to the program descriptor, the error handling operation including performing a program operation on a second physical address included in a second read descriptor which is enqueued in the command queue after a program operation performed on a first physical address fails and the error handling operation has passed, and
   a descriptor generator configured to generate the second read descriptor including the second physical address in response to the exception signal and enqueue the second read descriptor in the command queue.

2. The memory system of claim 1, wherein the processor further comprises a read manager configured to control the memory device to read data from the second physical address based on the enqueued second read descriptor.

3. The memory system of claim 1, wherein, after the first read descriptor is enqueued in the command queue, the queue manager compares the stored first physical address to the physical address included in the first read descriptor.

4. The memory system of claim 1, wherein, after the first physical address is stored in the fail managing buffer, the queue manager compares the first physical address to the physical address included in the first read descriptor.

5. The memory system of claim 1, wherein the memory interface further comprises multiple queue managers and multiple command queues which correspond to the plurality of memory dies respectively.

6. The memory system of claim 1, wherein the program descriptor comprises information on a program command, a first logical address, the first physical address and program data.

7. The memory system of claim 6, wherein the first read descriptor comprises information on a read command, the first logical address and the first physical address.

8. The memory system of claim 7, wherein the second read descriptor comprises information on the read command, the first logical address and the second physical address.

9. The memory system of claim 1, wherein a memory block for the second physical address is a normal open block.

10. The memory system of claim 2, wherein the memory device provides a fail signal to the program manager after the program operation fails.

11. An operating method of a memory system including a memory device having a plurality of memory dies; and a controller having a host interface, a memory interface, and a processor, the memory interface having a command queue, a fail managing buffer, and a queue manager, and the processor having a program manager and a descriptor generator, the operating method comprising:
    enqueuing, by the command queue, a program descriptor and a first read descriptor in the command queue;
    controlling, by the program manager, the memory device to perform an error handling operation in response to the program descriptor, the error handling operation including performing a program operation on a second physical address included in a second read descriptor which is enqueued in the command queue after a program operation performed on a first physical address fails and the error handling operation has passed;
    temporarily storing, by the fail managing buffer, the first physical address for the failed program operation in the fail managing buffer;
    preventing failed data at the first physical address for the failed program operation from being read by deleting, by the queue manager, the first read descriptor from the command queue and outputting an exception signal, after a physical address included in the first read descriptor is stored in the fail managing buffer; and
    generating, by the descriptor manager, the second read descriptor including the second physical address in response to the exception signal and enqueuing the second read descriptor in the command queue.

12. The operating method of claim 11, further comprising reading data from the second physical address based on the enqueued second read descriptor.

13. The operating method of claim 11, wherein the deleting of the first read descriptor comprises comparing the stored first physical address to the physical address included in the first read descriptor, after the first read descriptor is enqueued in the command queue.

14. The operating method of claim 11, wherein the deleting of the first read descriptor comprises comparing the first physical address to the physical address included in the first read descriptor, after the first physical address is stored in the fail managing buffer.

15. The operating method of claim 11, further comprising:
storing the first physical address for each of a plurality of memory dies in the fail managing buffer; and
queuing the first read descriptor in the command queue.

16. The operating method of claim 11, wherein the program descriptor comprises information on a program command, a first logical address, the first physical address and program data.

17. The operating method of claim 16, wherein the first read descriptor comprises information on a read command, the first logical address and the first physical address.

18. The operating method of claim 17, wherein the second read descriptor comprises information on the read command, the first logical address and the second physical address.

19. The operating method of claim 11, wherein a memory block for the second physical address is a normal open block.

20. A memory controller comprising:
a processor configured to control a program operation and a read operation of the memory device;
a memory interface configured to interface the processor and a memory device having a plurality of dies; and
a host interface configured to interface the processor and a host device;
wherein the memory interface comprises:
a command queue configured to queueing a program descriptor and a first read descriptor therein, and sequentially provide the queued descriptors to the memory device;
a fail managing buffer configured to temporarily store a first physical address for a failed program operation; and
a queue manager configured to prevent failed data at the first physical address for the failed program operation from being read by deleting the first read descriptor from the command queue and outputting an exception signal, after a physical address in the first read descriptor is stored in the fail managing buffer,
wherein the processor comprises:
a program manager configured to controlling the memory device to perform an error handling operation in response to the program descriptor, the error handling operation including performing a program operation on a second physical address included in a second read descriptor which is enqueued in the command queue after a program operation performed on the first physical address fails and the error handling operation passes; and
a descriptor generator configured to generate the second read descriptor including the second physical address in response to the exception signal and enqueue the second read descriptor in the command queue.

* * * * *